United States Patent [19]

Walker et al.

[11] Patent Number: 5,204,052
[45] Date of Patent: Apr. 20, 1993

[54] NUCLEAR FUEL ROD ACCUMULATION MACHINE

[75] Inventors: Edward S. Walker, Wilmington; Wilbur L. Croom, Hampstead, both of N.C.

[73] Assignee: General Electric Company, San Jose, Calif.

[21] Appl. No.: 755,413

[22] Filed: Sep. 5, 1991

[51] Int. Cl.⁵ .............................................. G21C 21/00
[52] U.S. Cl. ...................................... 376/261; 53/154
[58] Field of Search .................... 376/260, 261; 53/154

[56] References Cited

U.S. PATENT DOCUMENTS

| | | | |
|---|---|---|---|
| 4,723,359 | 2/1988 | Blissell et al. | 376/261 |
| 4,894,848 | 1/1990 | Lambert et al. | 376/261 |
| 4,952,072 | 8/1990 | Ellingston et al. | 376/261 |
| 4,980,119 | 12/1990 | Schoenig et al. | 376/261 |

Primary Examiner—Donald P. Walsh
Assistant Examiner—Frederick H. Voss
Attorney, Agent, or Firm—Robert R. Schroeder

[57] ABSTRACT

To mechanize the accumulation of nuclear fuel rods into fuel bundle groups, fuel rods are uploaded onto an input table from a succession of trays containing fuel rods of different rod types. The serial number of each fuel rod is read during procession across the input table to an output queue. An input elevator uniformly distributes fuel rods from the output queue to plural levels of an accumulation rack until each level contains an identical number of fuel rods of each rod type necessary to completely assemble one fuel bundle. An output elevator then empties the accumulation rack, one level at a time, to an output table, from which the fuel rods from each level are downloaded into separate bundle trays.

19 Claims, 2 Drawing Sheets

NUCLEAR FUEL ROD ACCUMULATION MACHINE

The present invention relates generally to article handling apparatus and particularly to automated apparatus for accumulating nuclear fuel rods in groups according to number and rod type for subsequent assembly into fuel bundles.

BACKGROUND OF THE INVENTION

Heretofore the procedure of accumulating nuclear fuel rods into fuel bundle groups has been a manual operation. From various rod trays containing different types of fuel rods, operators pick out the number of each rod type specified for a particular fuel bundle and place them in a tray assigned to that bundle. This bundle tray is then removed for transport to a bundle assembly site where the fuel rods are removed and arranged in specified positions in fuel bundle assembly. The fuel rods are approximately 0.5 inches in diameter and may range in length from 5 to 14 feet. The longest fuel rods can weight up to 10 pounds. Current fuel bundle designs typically call for sixty fuel rods of as many as thirteen different rods types. Further designs will call for a greater number of rods of even more different rod types per bundle.

It is thus seen that manual accumulation of fuel rods in successive bundle trays is highly labor intensive and time-consuming. If a particular bundle is to include thirteen different types of fuel rods, the operators must pick varying numbers of fuel rods from at least thirteen rod trays and deposit them in one bundle tray. When the full complement of fuel rods has been accumulated in this bundle tray, it is removed to the bundle assembly site, and the process is repeated for the next bundle tray. While the operators are typically guided by a computerized accounting and tracking system, the tedious nature of the accumulation process leads to mistakes which then have to be corrected at the bundle assembly site. Moreover, the manual picking and placing of rods from tray to tray can inflict surface blemishes on the rods, which are potential sites for corrosion when subjected to a reactor environment.

SUMMARY OF THE INVENTION

It is accordingly an objective of the present invention to mechanize the accumulation of fuel rods into bundle groups so as to dramatically reduce accumulation time, to eliminate costly errors in accumulation, and to reduce the potential for rod damage. Thus, the present invention provides a nuclear fuel rod accumulation machine capable of expeditiously accumulating fuel rods for multiple fuel bundles on a concurrent, automated basis. To this end, the accumulation machine include an inclined input table on which fuel rods of different types are uploaded from a succession of rod trays. The rods then roll by gravity across the input table from an input queue to an output queue through an intermediate serial number reading station under the control of escapement stops. At the reading station, the unique serial number borne by each rod is read into an accounting and tracking system by an optical reader.

An input elevator picks up fuel rods from the output queue and deposits them on multiple, inclined shelves positioned at different levels of an accumulation rack. Each shelf has the capacity to accumulate the full complement of fuel rods for one fuel bundle, e.g. sixty fuel rods. When a full bundle's worth of fuel rods have been accumulated on each of the shelves, an output elevator begins emptying the accumulation rack one shelf at a time. That is, the output elevator picks up all the fuel rods from one self in small groups and deposits them in succession on an inclined output table from which they are downloaded into a bundle tray. When all of the fuel rods from one shelf have been downloaded to a bundle tray, this tray contains the full complement of fuel rods for assembly into a fuel bundle and is removed to the bundle assembly site. Only then are the fuel rods on another shelf offloaded into a different bundle tray. Once the entire accumulation rack is emptied of fuel rods, the process of fuel rod accumulation can begin again.

To further mechanize the process, pick and place mechanisms are utilized to upload fuel rods from the rod trays onto the input table and to download fuel rods from the output table into the bundle trays.

The invention accordingly comprises the features of construction, combination of elements and arrangement of parts, all as disclosed hereinafter, and the scope of the invention will be indicated in the claims.

BRIEF DESCRIPTION OF THE DRAWINGS

For a full understanding of the nature and objects of the invention, reference may be had to the following Detailed Description taken in connection with the accompanying drawings, in which.

Corresponding reference numerals refer to like parts throughout the several views of the drawings.

DETAIL DESCRIPTION

Figure 1:
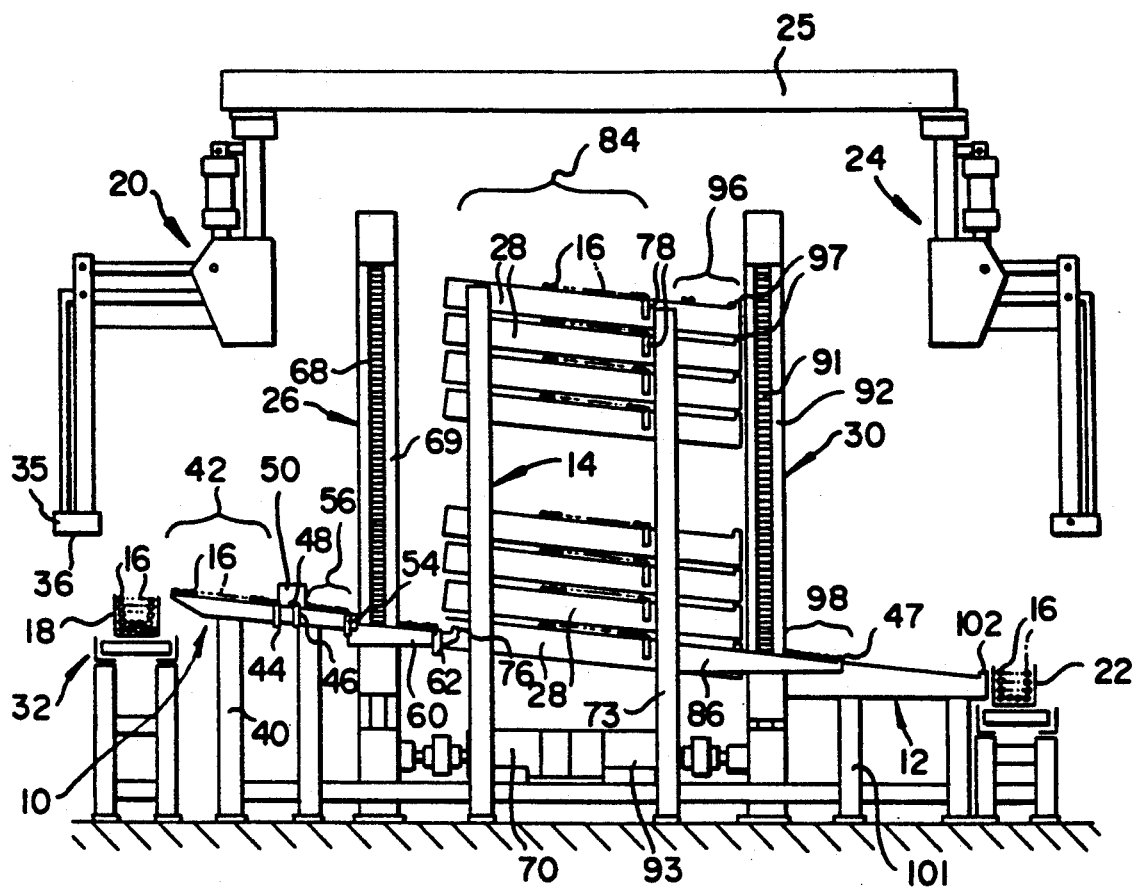
FIG. 1 is a side elevation view of a nuclear fuel rod accumulation machine constructed in accordance with an embodiment of the present invention.

The nuclear fuel rod accumulation machine of the present invention includes, as seen in FIG. 1, an input table, generally indicated at 10, an output table, generally indicated at 12, and an intermediate accumulation rack, generally indicated at 14. Nuclear fuel rods 16 are uploaded from a succession of rod trays 18 onto the input table via a pick and place rod handing manipulator, generally indicated at 20, and are downloaded from the output table into a succession of bundle trays 22 via a second pick and place rod handling manipulator, generally indicated at 24; both manipulators being supported by overhead beams 25. An input elevator, generally indicated at 26, picks up fuel rods from the input table and deposits them onto levels or shelves 28 of the accumulation rack, and an output conveyor, generally indicated at 30, picks up fuel rods from the shelves and deposits them on the output table. The fuel rod supports throughout the machine are inclined, such that rod horizontal procession through the machine from input table to output table is by rolling motion under the influence of gravity.

Figure 2:
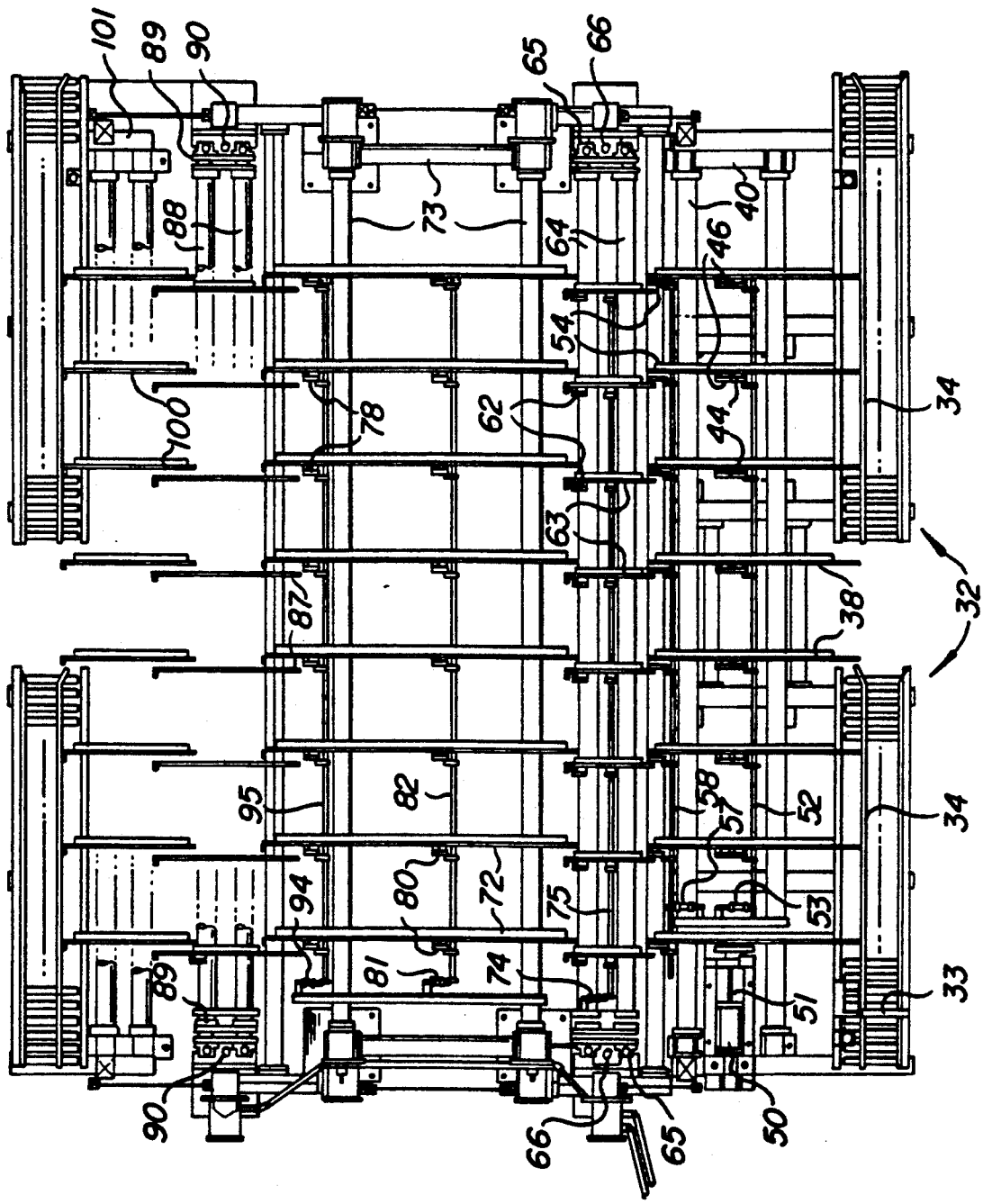
FIG. 2 is a plan view of the accumulation machine of FIG. 1.

Referring jointly to FIGS. 1 and 2, rod trays 18 are presented to the accumulation machine on a roller conveyor 32. As seen in FIG. 2, this rod tray conveyor may be provided in two longitudinally aligned sections with an intermediate gap to afford convenient access to the machine for servicing and maintenance purposes. Trays are introduced from the right and rolled to an uploading position determined by a stop 33. Coextensive guides 34 serve to control the transverse position of the trays on the roller conveyor. An operator hand guides rod handling manipulator 20 to lower a longitudinally elongated pickup head 35 into the tray. The pickup head is equipped with transversely spaced sets of longitudinally distributed suction cups 36 which are brought to bear against the upper tier of fuel rods orderly arranged in the tray. A vacuum is then pulled on the suction cups, which then become attached to the rods, such that they can be lifted from the tray and deposited on the more elevated input side of the input table top. It will be appreciated that, rather than utilizing a conventional manually facilitated rod handling manipulator, this function can be completely automated in the manner taught in commonly assigned Schoenig, Jr. et al. U.S. Pat. No. 4,980,119, entitled "Multizone Automated Nuclear Fuel Rod Loading System", the disclosure of which is expressly incorporated herein by reference. Alternatively, the fuel rods may be uploaded from the rod trays onto the input table by hand, thus avoiding the added expense of mechanized rod handling equipment. The same alternatives are equally applicable to handling the downloading of fuel rods from output table 12 into bundle trays 22. That is, hand controlled rod handling manipulator 24 may be automated or dispensed with, as desired.

As clearly seen in FIG. 2, input table is provided as a plurality of spaced, parallel rails 38 on which the fuel rods are supported at regular intervals along their length. These rails are mounted by a stand 40 with their upper edges lying on a common inclined plane sloping away from rod tray conveyor 32. Preferably, the upper edges of these rails are provided by plastic runners such as to avoid scratching the rod surfaces as the rolls roll down the input table incline.

Figure 3:
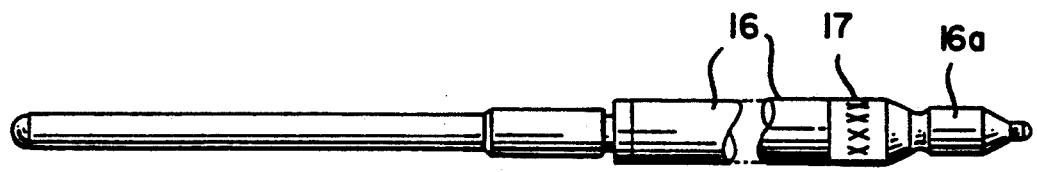
FIG. 3 is a side view of a typical nuclear fuel rod accumulated by the machine of FIG. 1.

The fuel rods uploaded from the rod trays are deposited on an input queue section 42 of the input table, from which they roll down and back up against a set of longitudinally aligned singulating escapement stops 44 which define the output side of the input queue. The capacity of the input queue is preferably at least equal to the maximum number of rods of any one rod type necessary in the assembly of the number of fuel bundles for which fuel rods are to be concurrently accumulated. Thus, the input queue may have, for example, a forty rod capacity. Fuel rods are singly released from the input queue by escapement stops 44 to roll a short distance to a second set of escapement stops 46 to detain each rod at a reading station 48. As seen in FIG. 3, each fuel rod 16 has a serial number 17 imprinted circumferentially about its front end plug 16a. This serial number uniquely identifies its fuel rod as to type, e.g., length, fuel makeup, etc., and is also critically important for tracing and accounting purposes. An optical reader 50 is mounted on a slide 51 (FIG. 2) along an end of the input table in alignment with reading station 48 for reciprocating movement into and out of serial number reading relation with end plug 16a. While in reading relation, an orbiting scanning head (not shown) reads the rod serial number for entry into the computerized tracking and accounting system. From this entry, the system can tell if each fuel rod is the correct one for accumulation by the machine and subsequent assembly into specifically assigned fuel bundles. If not, operation is halted, and the incorrect rod is manually removed from the reading station. If the scanning head fails to read the serial number correctly, the operator can enter it manually to determine if the rod is a correct one. While the serial number is being read, suitable clamps (not shown) hold the fuel rod steady. Reference may be had to the above-cited U.S. Pat. No. 4,980,119 for a disclosure of a fuel rod serial number reader suitable for application herein.

As seen in FIG. 2, the sets of escapement stops 44 and 46 are actuated off a common shaft 52 oscillated by an air cylinder 53, such that, as one fuel rod is escaped from the input queue, another fuel rod is escaped from reading station 48 to roll down into an output queue on the input table where they back up against a third set of escapement stops 54. The output queue, indicated at 56, has a rod capacity equal to the number of shelves 28 in accumulation rack 14, eight in the illustrated embodiment, which is the maximum number of fuel bundles for which fuel rods can be concurrently accumulated. When the output queue is full, escapement stops 54 are actuated via an air cylinder 57 and common actuating shaft 58, releasing the fuel rods to roll down onto a ramp 60 of input elevator 26 where they back up against another set of escapement stops 62.

As seen in FIG. 2, ramp 60, like input table 10, comprises a plurality of spaced, parallel rails 63 which are in longitudinally offset and partially transversely lapping relation with input table rails 38. Thus, vertical movement of the ramp is not obstructed by the input table. The elevator ramp rails 63 are mounted with their upper edges lying in a common inclined plane by cross members 64 joined at their corresponding ends by brackets 65. These brackets incorporate ball nuts 66 which threadingly engage vertical ball screws 68 journalled by mounting columns 69. The ball screws are commonly driven by a motor 70 to vertically position the ramp rails as a partially lapped continuum of the input table rails to provide a smooth transition from the input table to the ramp for the rods as they roll from the output queue onto the ramp. Once the output queue is emptied, the ramp is raised to a level slightly above the topmost shelf 28 of accumulation rack 14. Note that the positions of escapement stops 54 are such as to stop the fuel rods short of the lapping portions of the input table and ramp rails, and thus are held clear of the input elevator ramp so as not to obstruct its return to the lowermost loading position as the output queue is being refilled.

As seen in FIG. 2, each shelf 28 is likewise formed as a longitudinally distributed set of parallel rails 72 mounted with their upper edges lying in a common inclined plane by a framework 73. The shelf rails are in longitudinally offset and partially transversely lapped relation from the elevator ramp rails 63, such that vertical motion of the ramp is not obstructed. It will be noted from FIG. 1 that escapement stops 62 maintain the fuel rods on ramp 60 clear of shelves 28 as the ramp ascends to a level above the topmost accumulation rack shelf. At this point, escapement stops 62 are actuated by an air cylinder 74 and common actuating shaft 75 to release one rod which rolls down to a pickoff position established by a raised stop 76 at the output end of each ramp rail 63. As the ramp descends past the top level shaft, the fuel rod escaped to the pickoff position is picked off by the lapping portion of the shelf rails 72. Before the ramp descends to the level of the next lower shelf, a fuel rod is escaped to the pickoff position and deposited on this shelf as the ramp goes by. This operation is repeated as the ramp descends past each shelf. Thus, a single rod is dropped off on each shelf of the accumulation rack as the ramp descends smoothly to its lowermost loading position with respect to the input table. The fuel rods picked off by each shelf roll down on the shelf rails 72 and back up against a set of escapement stops 78.

As also seen in FIG. 2, an additional set of escapement stops 80 are positioned at a location midway between the input and output sides of the shelves to halt and then release the rods singly or as a group to roll down to escapement stops 78. This intermediate stoppage of the fuel rods is performed during the initial stages of rod accumulation to break up excessive momentum that otherwise would be developed by rods rolling a considerable distance across the shelves. Also, the intermediate escapement stops 80, actuated by air cylinder 81 and common shaft 82, are effective to reorient any rods that become skewed as they roll across the shelves.

The capacity of each accumulation shelf, indicated at 84 in FIG. 1, is sufficient to hold all of the fuel rods that will be assembled in an assigned fuel bundle. Once all of the fuel rods of one type necessary to assembly up to eight assigned fuel bundles in the illustrated embodiment have been uploaded to the input table from one or more rod trays 18, processed through the input and output queues through the serial number reading station, and accumulated on the shelves of the accumulation rack, a rod tray containing fuel rods of another rod type specified for the assigned fuel bundles is positioned on conveyor 32, and the requisite number of rods are uploaded onto the input table for accumulation in the accumulation rack in the same manner. When the full complement of fuel rods of the plurality of different rod types specified for the assigned bundles have been accumulated on each of the shelves 28, the input side of the machine is shut down, and the output side goes into action.

Output elevator 30 includes a ramp 86 likewise formed of a longitudinally distributed set of parallel rails 87 mounted with their upper edges lying in a common, inclined plane by cross members 88 and interconnecting end brackets 89. As in the case of input elevator 26, these end brackets incorporate ball nuts 90 which threadingly engage vertical ball screws 91 journalled by mounting columns 92 and commonly driven by a motor 93. The rails 87 of the output elevator ramp are longitudinally offset from the accumulation shelf rails 72 so they can assume transversely lapping relations with out interfering with output elevator operation. To unload fuel rods from a particular accumulation shelf, the set of escapement stops 78 for that shelf are actuated by an air cylinder 94 and common shaft 95 (FIG. 2) to escape singularly or as a group a number of fuel rods sufficient to fill an output buffer, indicated at 96. This output buffer is constituted by the section of the shelf rails 72 that extend out into lapping relation with elevator ramp rails 87 and can be dimensioned to hold, for example, fourteen fuel rods backed up against raised stops 97 at the output ends of the shelf rails. The output elevator ramp 86 then ascends to a level sightly above the shelf to be unloaded, in the process picking up the fuel rods waiting in the output buffer. These rods roll down across the elevator ramp rails 87 and back up against fixed rail stops 97 to be held as group in an offload queue 98 on the ramp. The ramp then descends to a level below output table 12, in the process dropping off the fuel rods in the output table.

As seen in FIG. 2, the output table includes a longitudinally distributed set of parallel rails 100 mounted by a stand 101 with their upper edges lying in a common inclined plane. These rails are longitudinally offset from the elevator ramp rails 87 such that they can provide portions in lapping relation with the section of the ramp rails serving as offload queue 98. Thus, as the ramp descends past the output table, rails 100 pick off the fuel rods from the offload queue, which then roll down across the output table and back up against rail stops 102. While the elevator ramp returns to the same accumulation shelf to pick up another group of fuel rods escaped to its output buffer, the previous group of fuel rods can be downloaded into a bundle tray 22 resting on a roller conveyor 104. Downloading is facilitated by rod handling manipulator 24, if so equipped, or by hand. Each accumulation shelf is unloaded completely and its fuel rods are downloaded into a specifically assigned bundle tray to clear the output table before the next shelf is unloaded. Assurance is thus achieved that the fuel rods accumulated on a particular shelf assigned to a specific fuel bundle are all downloaded into an bundle tray earmarked for that bundle. Shelf unloading would typically be performed in an orderly fashion, i.e., in either ascending or descending order. Once the accumulation rack is completely emptied of fuel rods, the output side of the machine is shut down, and the input side is activated to begin accumulating fuel rods for the next batch of up to eight fuel bundles.

It will be appreciated that under certain circumstances, the input and output sides of the machine may operate concurrently. For example, a bundles-worth of fuel rods may be accumulated on each of the upper four shelves and then unloaded while fuel rods are being accumulated on the lower four shelves. Moreover, while it is most expedient to concurrently accumulate fuel rods in the accumulation rack on the basis that the fuel bundles of each batch are of the same fuel design, i.e., the same number of rods of the same types on each shelf, it will be appreciated that a computerized accounting and tracking system may guide the uploading of fuel rods from various rod trays and control the machine so as to accumulate fuel rods on the shelves for bundles that differ in fuel design.

While not shown, it will be understood that the fuel rod accumulation machine also includes a network of sensors to detect the arrival of fuel rods at various locations throughout the machine and thus permit coordination of the various machine operations so as to minimize dwell time and thus maximize throughput. Some of these sensor are also utilized to provide fuel rods counts to ensure that none are left behind and that each bundle tray gets it full complement of fuel rods. It will be appreciated that, as in the case of the input table rails, the rails of the output table, elevator ramps and accumulation rack shelves are preferably all equipped with plastic running strips as their upper edges to avoid scratching the rod surfaces. The illustrated mid-level gap between the shelves of the accumulation rack is provided to satisfy critical mass spacing requirements.

From the foregoing, it is seen that the objectives set forth above, including those made apparent from the preceding Detail Description, are efficiently achieved, and since certain changes may be made in the construction set forth without departing from the scope of the invention, it is intended that matters of detail be taken as illustrative and not in a limiting sense.

Having described the invention, what is claimed as new and desired to secure by Letters Patent is:

1. A nuclear fuel rod accumulation machine for concurrently accumulating fuel rods of various rod types from a succession of rod trays in a succession of bundle trays, said machine comprising, in combination:
  A. an input table on which fuel rods are uploaded from rod trays for procession from an input queue to an output queue through a reading station;
  B. a serial number reader for reading a unique serial number from each fuel rod while detained at said reading station;
  C. an accumulation rack having a plurality of vertically spaced shelves;
  D. an input elevator for picking up plural fuel rods from said output queue and distributing the fuel rods to said shelves;
  E. an output table; and
  F. an output elevator for picking up all of the fuel rods from each of said shelves and depositing the fuel rods on said output table in separate fuel bundle groups for downloading into separate bundle trays.

2. The nuclear fuel rod accumulation machine defined in claim 1, wherein said input table is inclined such that the fuel rods roll by gravity from said input queue to said output queue through said reading station.

3. The nuclear fuel rod accumulation machine defined in claim 2, wherein said input table includes a first set of escapement stops for singly releasing fuel rods to roll from said input queue to said reading station and a second set of escapement stops for releasing each fuel rod from said reading station to roll into said output queue.

4. The nuclear fuel rod accumulation machine defined in claim 3, wherein said output queue is sized to hold a number of fuel rods at least equal to the number of said shelves.

5. The nuclear fuel rod accumulation machine defined in claim 4, wherein each said shelf is sized to hold a fuel bundle group comprised of the number of fuel rods necessary to completely assemble one fuel bundle.

6. The nuclear fuel rod accumulation machine defined in claim 5, wherein said input elevator includes an inclined input ramp mounted for vertically reciprocating movement, and said input table further includes a third set of escapement stops for releasing the fuel rods in said output queue to roll from said input table onto said input ramp.

7. The nuclear fuel rod accumulation machine defined in claim 6, wherein said input ramp includes a fourth set of escapement stops operating to singularly distribute the fuel rods thereon to different ones of said shelves as said input ramp passes by during vertical movement.

8. The nuclear fuel rod accumulation machine defined in claim 7, wherein said input table, said input ramp and said shelves include separate sets of longitudinally distributed rails having upper edges lying in respective inclined planes to provide smooth rolling support for the fuel rods, said rail set of said input ramp having opposite end portions in lapping relation with end portions of said rail sets of said input table and said shelves so as to accommodate fuel rod transitions therebetween.

9. The nuclear fuel rod accumulation machine defined in claim 8, wherein said end portions of said rails of said input ramp in lapping relation with said end portions of said shelf rail sets and are terminated in raised rail stops to establish a pickoff position into which fuel rods roll upon release by said fourth set of escapement stops.

10. The nuclear fuel rod accumulation machine defined in claim 9, wherein said fourth set of escapement steps singularly releases fuel rods to said pickoff position in coordination with the descent of said input ramp past said shelves, such that single fuel rods are successively picked off by each of said lapping end portions of said shelf rails as said input ramp descends past said shelves.

11. The nuclear fuel rod accumulation machine defined in claim 10, wherein each said shelf includes a fifth set of escapement stops, each fuel rod picked off from said input ramp by said shelf rails rolling across said shelves to back up against said fifth escapement stop sets to ultimately accumulate on each said shelf the requisite number of fuel rods to assemble one fuel bundle.

12. The nuclear fuel rod accumulation machine defined in claim 11, wherein each said shelf further includes rails portions extending beyond said fifth set of escapement stops and terminating in raised rail stops to define an output buffer, said fifth escapement stop sets operating to release fuel rods to roll into said output buffers.

13. The nuclear fuel rod accumulation machine defined in claim 12, wherein said output elevator includes an inclined output ramp mounted for vertical movement relative to said accumulation rack to pick up fuel rods from said output buffers and deposit the fuel rods on said output table.

14. The nuclear fuel rod accumulation machine defined in claim 13, wherein said output ramp and said output table include separate sets of longitudinally distributed rails having upper edges in respective inclined planes to provide smooth rolling support for the fuel rods, said output ramp rail set having pickup rail portions in lapping relation with said rail portions of said shelf rail sets supporting the fuel rods in said output buffers and offload queue rail portions in lapping relation with end portions of said output table rail set, whereby fuel rods in said output buffers are picked up on said pickup portions of said output ramp rail set as said output ramp ascends therepast, the fuel rods rolling down onto said offload queue rail portions from which the fuel rods are picked off by said lapping portions of said output table rail set as said output ramp descends therepast.

15. The nuclear fuel rod accumulation machine defined in claim 5, which further includes an input conveyor on which rod trays as presented to said input table and an output conveyor on which bundle tray are presented to said output table.

16. The nuclear fuel rod accumulation machine defined in claim 15, which further includes rod handling manipulators for facilitating the uploading of fuel rods from the rod trays onto said input table and the downloading of fuel rods from said output table into the bundle trays.

17. A method for accumulating fuel rods of various types in bundle groups for assembly in fuel bundles, said method comprising the steps of:
  A. uploading onto an input table fuel rods from rod trays containing fuel rods of different rod types;
  B. reading the serial numbers of successive fuel rods during procession across the input table to an output queue;
  C. distributing fuel rods from the output queue to plural levels of an accumulation rack until each level is filled with the number of fuel rods of each specified rod type necessary to fully assemble one fuel bundle;

D. successively downloading the fuel rods from each accumulation rack level into separate bundle trays, such that each bundle tray contains all of the fuel rods accumulated on a different one of the accumulation rack levels.

18. The method defined in claim 17, wherein said distributing step includes repeatedly taking a plurality of fuel rods from the output queue equal to the number of accumulation rack levels to be filled and depositing one fuel rod on each of those levels.

19. The method defined in claim 18, which further includes the steps of providing an inclined input table and inclined shelves as the accumulation rack levels, such that the fuel rod roll into the output queue and roll from an uploading side to a downloading side of the accumulation rack under the influence of gravity.

* * * * *